(12) United States Patent
Oishi et al.

(10) Patent No.: US 6,879,953 B1
(45) Date of Patent: Apr. 12, 2005

(54) SPEECH RECOGNITION WITH REQUEST LEVEL DETERMINATION

(75) Inventors: Tetsuya Oishi, Iwaki (JP); Humio Saito, Leonia, NJ (US)

(73) Assignee: Alpine Electronics, Inc., Tokyo (JP)

( * ) Notice: Subject to any disclaimer, the term of this patent is extended or adjusted under 35 U.S.C. 154(b) by 945 days.

(21) Appl. No.: 09/689,955

(22) Filed: Oct. 12, 2000

(30) Foreign Application Priority Data

Oct. 22, 1999 (JP) .......................................... 11-300809

(51) Int. Cl.[7] .......................... G10L 11/04; G10L 15/00; G10L 15/22
(52) U.S. Cl. ........................ 704/231; 704/205; 704/255
(58) Field of Search ................................ 704/205, 206, 704/207, 255, 231, 251, 252, 270, 275, 254

(56) References Cited

U.S. PATENT DOCUMENTS

| | | | | |
|---|---|---|---|---|
| 4,490,840 A | * | 12/1984 | Jones | 704/276 |
| 5,159,637 A | | 10/1992 | Okazaki et al. | |
| 5,553,119 A | * | 9/1996 | McAllister et al. | 379/88.01 |
| 6,173,260 B1 | * | 1/2001 | Slaney | 704/250 |
| 6,212,502 B1 | * | 4/2001 | Ball et al. | 704/270 |
| 6,236,968 B1 | * | 5/2001 | Kanevsky et al. | 704/275 |
| 6,343,269 B1 | * | 1/2002 | Harada et al. | 704/243 |
| 6,430,523 B1 | * | 8/2002 | Mizokawa | 702/182 |
| 6,665,644 B1 | * | 12/2003 | Kanevsky et al. | 704/275 |
| 6,671,668 B2 | * | 12/2003 | Harris | 704/246 |
| 6,697,457 B2 | * | 2/2004 | Petrushin | 379/88.08 |
| 6,804,817 B1 | * | 10/2004 | Kimura et al. | 719/315 |

* cited by examiner

*Primary Examiner*—Richemond Dorvil
*Assistant Examiner*—Martin Lerner
(74) *Attorney, Agent, or Firm*—Brinks Hofer Gilson & Lione (57) ABSTRACT

A recognition result determination section determines whether or not a character string identified by a speech recognition section through a speech recognition process includes a desire type character string (non-specific instruction type operation character string) in which an object to be operated is not specified. Further, a request level determination section determines a request level related to the desire type character string by detecting a change in sound pressure level on the basis of a speech signal. When the recognition result determination section makes a positive decision, a level-based instruction execution section specifies the object to be operated and gives a predetermined operation instruction on the basis of a content of the desire type character string and a request level determination result.

20 Claims, 7 Drawing Sheets

| DESIRE TYPE CHARACTER STRING | SPECIFIC INSTRUCTION TYPE CHARACTER STRING |
|---|---|
| TSUKARETA (I AM TIRED) | EAKON WO TSUKERU (TURN ON AIR CONDITIONER) |
| ONAKAGASUITA (I AM HUNGRY) | RESUTORAN WO SAGASU (FIND A RESTAURANT) |
| ATSUI (I FEEL HOT) | NUKEMICHI WO SAGASU (FIND A BYPATH) |
| SAMUI (I FEEL COLD) | |
| ⋮ | ⋮ |

| DESIRE TYPE CHARACTER STRING | LEVEL | OPERATION INSTRUCTION |
|---|---|---|
| TSUKARETA | 1 | INDICATION OF CONTINUOUS DRIVING HOURS |
| | 2 | INDICATION OF MESSAGE SUGGESTING THAT USER TAKE A REST |
| | 3 | INSTRUCTION TO FIND REST AREA |
| ATSUI | 1 | INDICATION OF TEMPERATURE INSIDE VEHICLE |
| | 2 | INDICATION OF QUESTION AS TO WHETHER USER WISHES TO OPERATE AIR CONDITIONER |
| | 3 | INSTRUCTION TO OPERATE AIR CONDITIONER |
| ⋮ | ⋮ | ⋮ |

SPEECH RECOGNITION WITH REQUEST LEVEL DETERMINATION

BACKGROUND OF THE INVENTION

The present invention relates to a speech processing system which subjects input speech or input words to speech recognition and outputs various operation instructions on the basis of a result of the speech recognition.

Many systems have conventionally been available which input operation instructions or the like to various units through a speech recognition technology. Such a conventional system is equipped with a speech processing system that subjects speech or words, which are spoken by a user in order to input an operation instruction or the like, to a speech recognition process to thereby specify both a unit to be operated and an operation to be performed and that outputs an operation instruction corresponding thereto. Taking a vehicle system comprising various vehicle units, such as a navigation unit, an audio unit and an air conditioner, as an example, the above-mentioned speech processing system can give an operation instruction by means of speech to such units, thereby allowing the user to operate them with ease, particularly when his body is shaken during driving.

In the above-mentioned conventional speech processing system, when an operation instruction is given in the form of speech, it is required to clearly specify a unit to be operated and an operation to be performed. For example, when the user wishes to find a restaurant close to the current vehicle position in the above-mentioned example of the vehicle system, the user inputs words instructing to "find a restaurant" or the like, so that the speech processing system specifies from the word "restaurant" the navigation unit as the unit to be operated and from the word "find" an operation of finding a restaurant as the specific operation to be performed, and outputs an operation instruction corresponding thereto to the navigation unit.

However, a person who entertains some kind of feeling, desire or the like generally often speaks first a phrase that honestly expresses such a feeling, desire or the like. This is understood from words spoken by a child who has only a small vocabulary. When he is hungry, he says, first of all, "I'm hungry" which directly expresses his desire, rather than "I want to eat something" or "I want to go to a restaurant" which indicate more specific objects. However, the conventional speech processing system cannot specify a unit to be operated and an operation to be performed from a phrase expressing a feeling, desire or the like, and thus the user has to memorize a predetermined phrase necessary to give a desired operation instruction. Hence, the conventional speech processing system has not necessarily been a user-friendly machine.

To respond to the above-mentioned phrases honestly expressing a feeling, desire or the like in the conventional speech processing system, a table of correspondence between such phrases and specific operation instructions must be stored. For example, the phrase "I'm hungry" should be made to correspond to an operation instruction to "find a restaurant," a phrase "I feel hot" should be made to correspond to an operation instruction to "reduce the temperature setting of the air conditioner," and a phrase "I'm tired" should be made to correspond to an operation instruction to "find a rest area." That is, as long as phrases are made to correspond to operation instructions on a one-to-one basis, even the conventional speech processing system can respond to phrases honestly expressing a feeling, desire or the like. However, taking the phrase "I'm hungry" as an example, when the user speaks this phrase, it may imply that he wishes to find a nearby convenience store to buy something to eat right away, or that he wishes to find a good restaurant to dine a little later since he can still control his hunger. However, as mentioned above, when phrases are made to correspond to operation instructions on a one-to-one basis, the operation instruction to "find a restaurant" is always specified for the phrase "I'm hungry" with no possibility of giving an operation instruction to "find a nearby convenience store." That is, the conventional speech processing system cannot determine a user's request level from a phrase spoken by the user to give an operation instruction corresponding to such a determined request level.

SUMMARY OF THE INVENTION

The present invention has been made in view of the above inconvenience, and an object thereof is to provide a speech processing system capable of giving an appropriate operation instruction even when a phrase in which neither an object to be operated nor a request level are specifically indicated is inputted.

To achieve the above object, the present invention provides a speech processing system which, when a speech signal is inputted, causes speech recognition means to subject the input speech signal to a speech recognition process to thereby specify a recognized character string corresponding to the speech signal, causes operation character string determination means to determine whether or not the recognized character string includes a non-specific instruction type operation character string in which an object to be operated is not specified, and causes request level determination means to determine a request level related to the operation character string on the basis of at least one of the speech signal and the recognized character string, and when the operation character string determination means makes a positive decision, causes operation instruction means to specify the object to be operated and give a predetermined operation instruction on the basis of the content of the operation character string and the request level determined by the request level determination means. Therefore, even if speech not specifically indicating an object to be operated and a request level is inputted, the object to be operated can be specified and an operation instruction can be given on the basis of the content of an operation character string and a request level related to this operation character string. Hence, various operation instructions can be inputted using natural spoken language close to a conversation between humans and, at the same time, an appropriate operation instruction corresponding to a request level can be selected.

It is further desirable that the above-mentioned operation character string determination means determines whether or not the recognized character string includes not only the non-specific instruction type operation character string but also a specific instruction type operation character string in which an object to be operated is specified, and when the recognized character string includes the specific instruction type operation character string, the operation instruction means gives a predetermined operation instruction to the object to be operated which has been specified on the basis of the specific instruction type operation character string. When the recognized character string includes a specific instruction type operation character string, an object to be operated can be specified easily from this specific instruction type character string, and thus a process for giving an operation instruction can be simplified.

It is still further desirable that when the recognized character string includes the non-specific instruction type character string and if the request level determined by the request level determination means is low, the operation instruction means instructs the object to be operated which has been specified by the non-specific instruction type operation character string to give various information. When the request level is low, a user may not be positively requesting that the object to be operated perform the predetermined operation, but may merely be requesting that various information be given. The speech processing system of the present invention can respond to such a request, and hence can accommodate various needs of the user with carefully-selected appropriate operation instructions.

It is still further desirable that the above-mentioned request level determination means extracts as a feature amount at least one of the loudness of a voice, the pitch of the voice and a phonation interval when determining a request level on the basis of the speech signal, and determines the request level on the basis of the feature amount which has been extracted. Generally, a change in feeling tends to appear in the form of a change in speech, and therefore, by extracting at least one of the above-mentioned feature amounts from the speech signal, the user's request level can be easily determined.

It is still further desirable that when determining a request level on the basis of the recognized character string, the above-mentioned request level determination means determines the request level on the basis of a character string related to a predetermined modifier included in the recognized character string. For example, when the recognized character string includes a character string related to a modifier, such as "a little" or "very much," the request level can be determined on the basis of such a character string. Therefore, even for a user whose speech changes so slightly that the system finds difficulty determining his request level on the basis of a change in any of the feature amounts extracted from the speech signal, the use of the above-mentioned predetermined modifier as a determination factor allows the user's request level to be determined reliably.

DETAILED DESCRIPTION OF THE INVENTION

Figure 1:
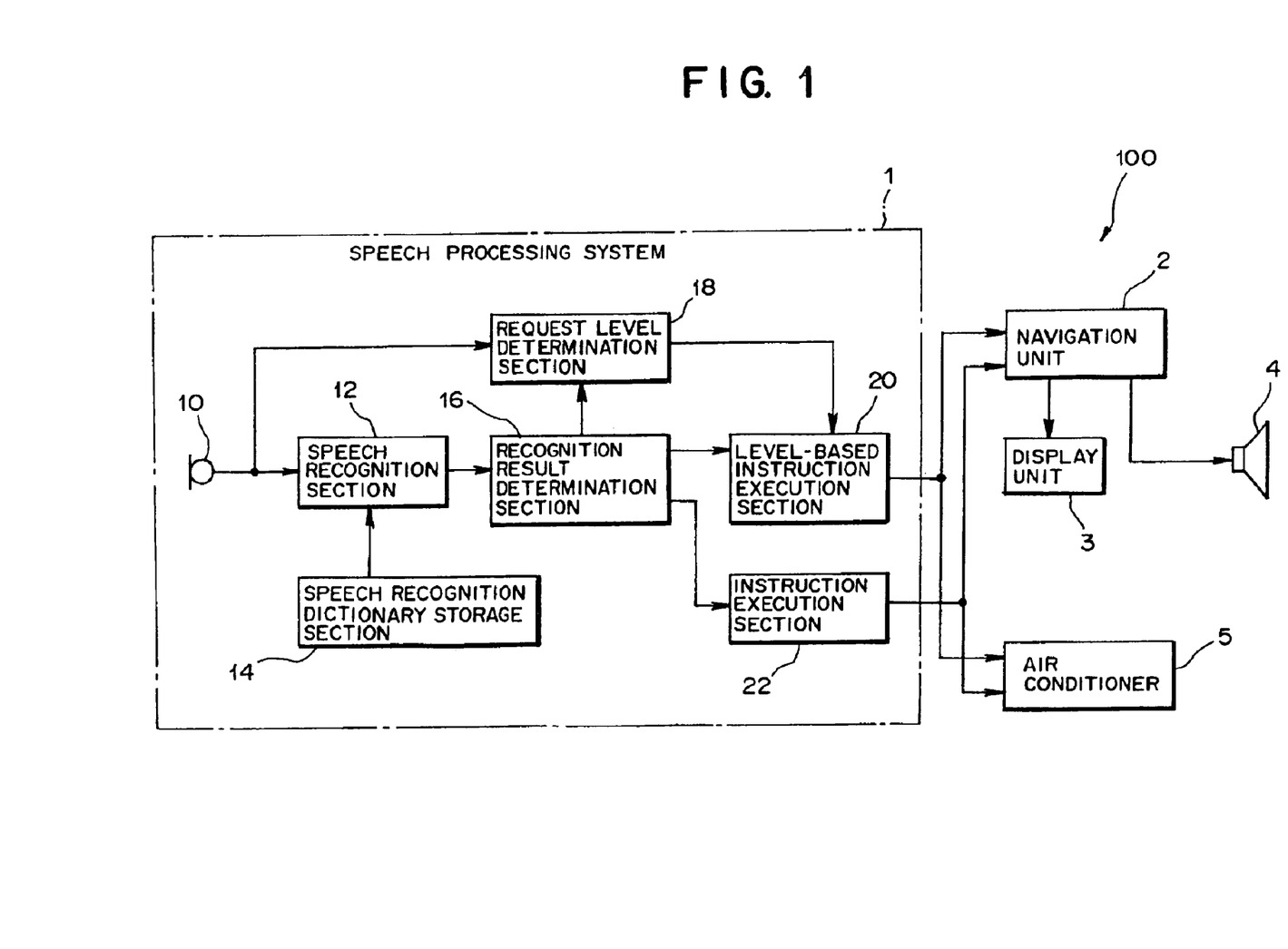
FIG. 1 is a block diagram showing the construction of a vehicle system according to an embodiment of the present invention.

An embodiment, in which a speech processing system according to the present invention is applied to a vehicle system, will be described with reference to the accompanying drawings. FIG. 1 is a block diagram showing the construction of a vehicle system according to the embodiment. A vehicle system 100 shown in FIG. 1 includes a speech processing system 1 for giving various operation instructions in response to speech or words spoken by a user, a navigation unit 2 for displaying a map of areas surrounding the user's vehicle by detecting the current position of the vehicle and performing operations such as searching and guiding a route to a destination selected by the user, a display unit 3 for displaying various images outputted from the navigation unit 2, a speaker 4 for outputting various spoken messages such as guide messages outputted from the navigation unit 2, and an air conditioner 5 for adjusting temperature and the like within the vehicle.

The speech processing system 1 shown in FIG. 1 includes a microphone 10, a speech recognition section 12, a speech recognition dictionary storage section 14, a recognition result determination section 16, a request level determination section 18, a level-based instruction execution section 20, and an instruction execution section 22.

The microphone 10 picks up speech or words spoken by the user and converts the speech or words into a speech signal. The speech recognition section 12 analyzes the speech signal outputted from the microphone 10, subjects the analyzed signal to a predetermined speech recognition process, and specifies a character string corresponding to the speech or words spoken by the user. The speech recognition dictionary storage section 14 stores a signal waveform corresponding to standard speech as a dictionary for speech recognition.

The recognition result determination section 16 determines whether a character string (recognized character string) specified by the speech recognition section 12 expresses a user's desire or clearly indicates a unit to which an operation instruction is given and an operation to be performed by such a unit. A character string expressing a user's desire will hereinafter be referred to as a "desire type character string," and a character string indicating both a unit to which an operation instruction is given and an operation to be performed will hereinafter be referred to as a "specific instruction type character string." The "desire type character string" corresponds to a "non-specific instruction type operation character string," and the "specific instruction type character string" corresponds to a "specific instruction type operation character string." When the recognition result determination section 16 determines a character string to be a desire type character string, it not only outputs this character string to the level-based instruction execution section 20, but also instructs the request level determination section 18 to output a request level detection result.

Figure 2:
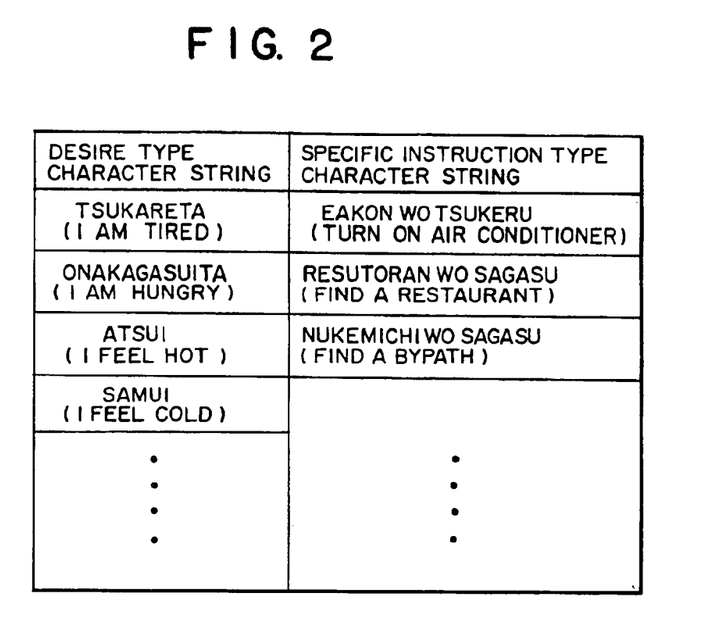
FIG. 2 is a diagram showing examples of desire type character strings and specific instruction type character strings.

FIG. 2 is a diagram showing examples of desire type character strings and specific instruction type character strings. In FIG. 2, those expressed in katakana, or a phonetic Japanese alphabet, show character strings as phonetically speech-recognized, and those expressed in parentheses below the katakana-written character strings show words actually spoken by the user. As shown in FIG. 2, desire type character strings include "TSUKARETA (I am tired)," "ONAKAGASUITA (I am hungry)," "ATSUI (I feel hot)" and "SAMUI (I feel cold)."

Further, specific instruction type character strings include "EAKON WO TSUKERU (Turn on the air conditioner)," "RESUTORAN WO SAGASU (Find a restaurant)" and "NUKEMICHI WO SAGASU (Find a bypath)." Specifically, for example, in "EAKON WO TSUKERU (Turn on the air conditioner)," which is one of the above-mentioned specific instruction type character strings, a character string "EAKON," which indicates an air conditioner, allows the system to identify that the unit to which an operation instruction is given is the air conditioner 5, and a character string "TSUKERU" allows the system to specify an operation to be performed (i.e., the air conditioner 5 should be operated). Further, in "NUKEMICHI WO SAGASU (Find a bypath)," which is another example of the specific instruction type character strings, a combination of a character string "NUKEMICHI" and a character string "SAGASU" allows the system to recognize that the user wishes to cause the navigation unit 2 (a unit to be operated) to find a bypath (an operation to be performed). As is understood from the above, each specific instruction type character string has the characteristic of clearly indicating both a unit to which an operation instruction is given and an operation to be performed. Note that the desire type character strings and the specific instruction type character strings are not limited to the above examples, but may include various other patterns.

By the way, in the actual speech recognition process, a character string extracted from an input speech signal indicating a phrase such as "EAKON WO TSUKERU" is generally identified as two character strings "EAKON" and "TSUKERU" with an article such as "WO" omitted. However, to simplify the illustration, a plurality of character strings including a character string corresponding to an article such as "WO" which are identified as expressing a single phrase during the speech recognition process will be collectively expressed as a single character string throughout this specification.

Figure 3:
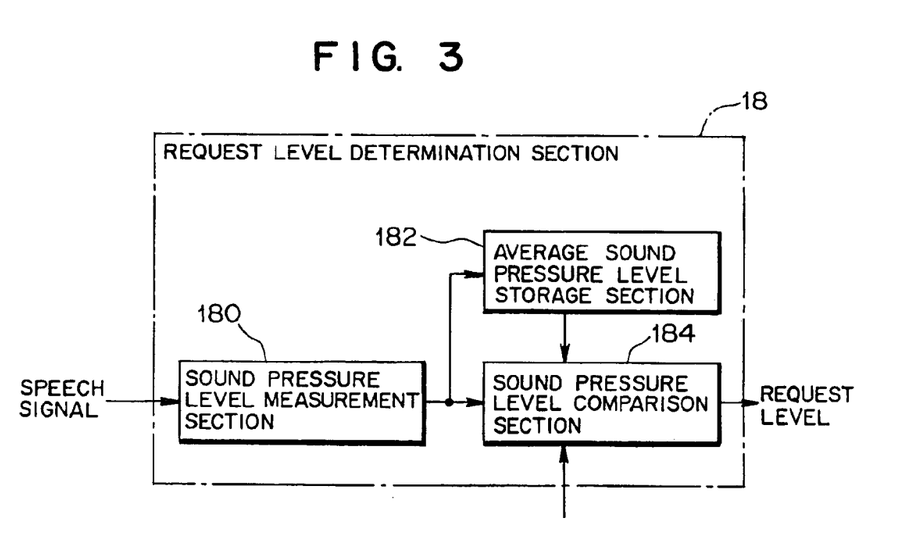
FIG. 3 is a block diagram showing a more detailed construction of a request level determination section.

The request level determination section 18 determines a request level indicated by the user on the basis of a change in the sound pressure of speech or words spoken by the user (a change in the loudness of his voice). FIG. 3 is a block diagram showing a more detailed construction of the request level determination section 18. As shown in FIG. 3, the request level determination section 18 includes a sound pressure level measurement section 180, an average sound pressure level storage section 182, and a sound pressure level comparison section 184. The sound pressure level measurement section 180 measures a sound pressure level on the basis of a speech signal outputted from the microphone 10, and converts the measured sound pressure level into digital data. The average sound pressure level storage section 182 stores an average sound pressure level of words spoken by the user as digital data. The average sound pressure level is updated every time the user inputs speech to the speech processing system 1 according to this embodiment. The sound pressure level comparison section 184 classifies the request levels to be indicated by the user into three levels, level 1 to level 3, by comparing the sound pressure level outputted from the sound pressure level measurement section 180 with the average sound pressure level stored in the average sound pressure level storage section 182. Specifically, the sound pressure level comparison section 184 groups sound pressure levels outputted from the sound pressure level measurement section 180 which are lower than the average sound pressure level into level 1, sound pressure levels which are substantially equal to the average sound pressure level into level 2, and sound pressure levels which are higher than the average sound pressure level into level 3. These levels 1 to 3 correspond to the user's request levels. That is, level 1 indicates that the user's request level is low and level 3 indicates that the user's request level is high, while level 2 indicates that the user's request level is between levels 1 and 3.

Figure 4:
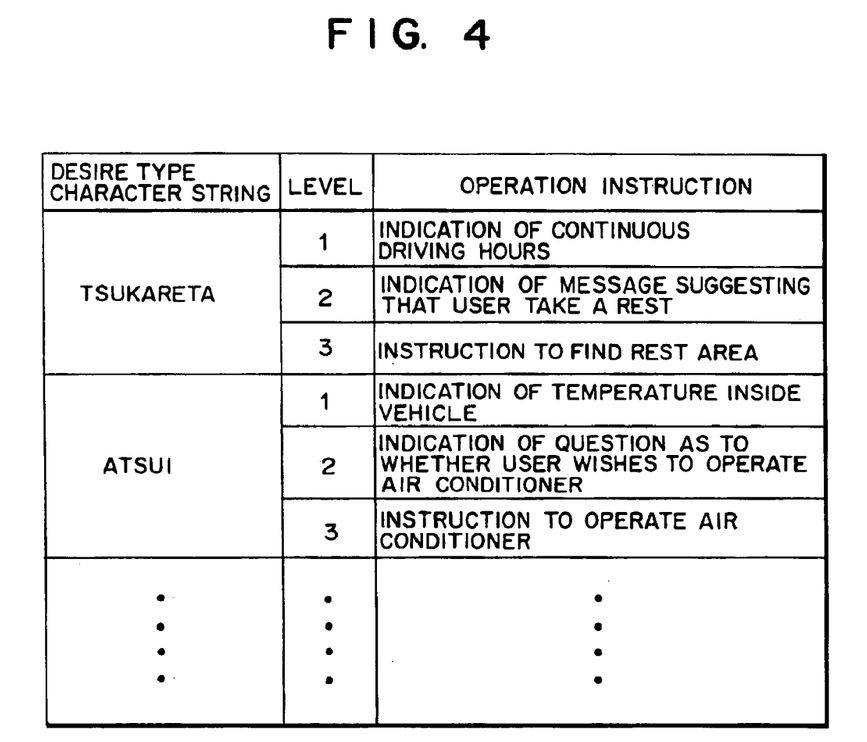
FIG. 4 is a diagram showing an exemplary operation instruction table.

The level-based instruction execution section 20 has an operation instruction table in which various operation instructions for operating units such as the navigation unit 2 are stored for selection, and selects and executes an appropriate operation instruction corresponding to both a character string (desire type character string) outputted from the recognition result determination section 16 and a request level determination result outputted from the request level determination section 18. FIG. 4 is a diagram showing an exemplary operation instruction table, which stores operation instructions prepared for levels 1 to 3 classified in correspondence to the contents of desire type character strings. For example, for the desire type character string "TSUKARETA," the table stores the following operation instructions in three levels: "Indication of continuous driving hours" (level 1); "Indication of a message suggesting that the user take a rest" (level 2); and "Instruction to find a rest area" (level 3). Further, for the desire type character string "ATSUI," the table stores the following operation instructions in three levels: "Indication of the temperature inside the vehicle" (level 1); "Indication of a question as to whether the user wishes to operate the air conditioner" (level 2); and "Instruction to operate the air conditioner" (level 3). Note that operation instructions corresponding to desire type character strings are not limited to those examples shown in FIG. 4, but may include various other patterns.

When a desire type character string outputted from the recognition result determination section 16 is "TSUKARETA" and a user's request level outputted from the request level determination section 18 is level 2, the level-based instruction execution section 20 selects an instruction, which is "Indication of a message suggesting that the user take a rest," from the above-mentioned operation instruction table shown in FIG. 4 and executes the selected instruction. In this case, a message such as "WHY DON'T YOU TAKE A REST?" is indicated to the user in the form of an image and speech. To indicate such a message in the form of an image and speech, the level-based instruction execution section 20 generates an image and a speech signal utilizing sections such as an image generation section (not shown) and an audio section (not shown), arranged in the navigation unit 2, and displays and announces the message on the display unit 3 through the speaker 4, respectively.

The instruction execution section 22 stores various operation instructions corresponding to specific instruction type character strings outputted from the recognition result determination section 16, and selects an operation instruction corresponding to the content of a specific instruction type character string to thereby output the selected instruction to the navigation unit 2 or the like. For example, when "RESUTORAN WO SAGASU (Find a restaurant)," which is one of the specific instruction type character strings, is inputted, the instruction execution section 22 outputs to the navigation unit 2 an operation instruction that causes the unit 2 to find restaurants located within a radius of 5 km from the current vehicle position and to display a list of the restaurants that are found.

The speech recognition section 12 and the speech recognition dictionary storage section 14 correspond to speech recognition means. The recognition result determination section 16 corresponds to operation character string determination means. The request level determination section corresponds to request level determination means. The level-based instruction execution section 20 and the instruction execution section 22 correspond to operation instruction means.

Figure 5:
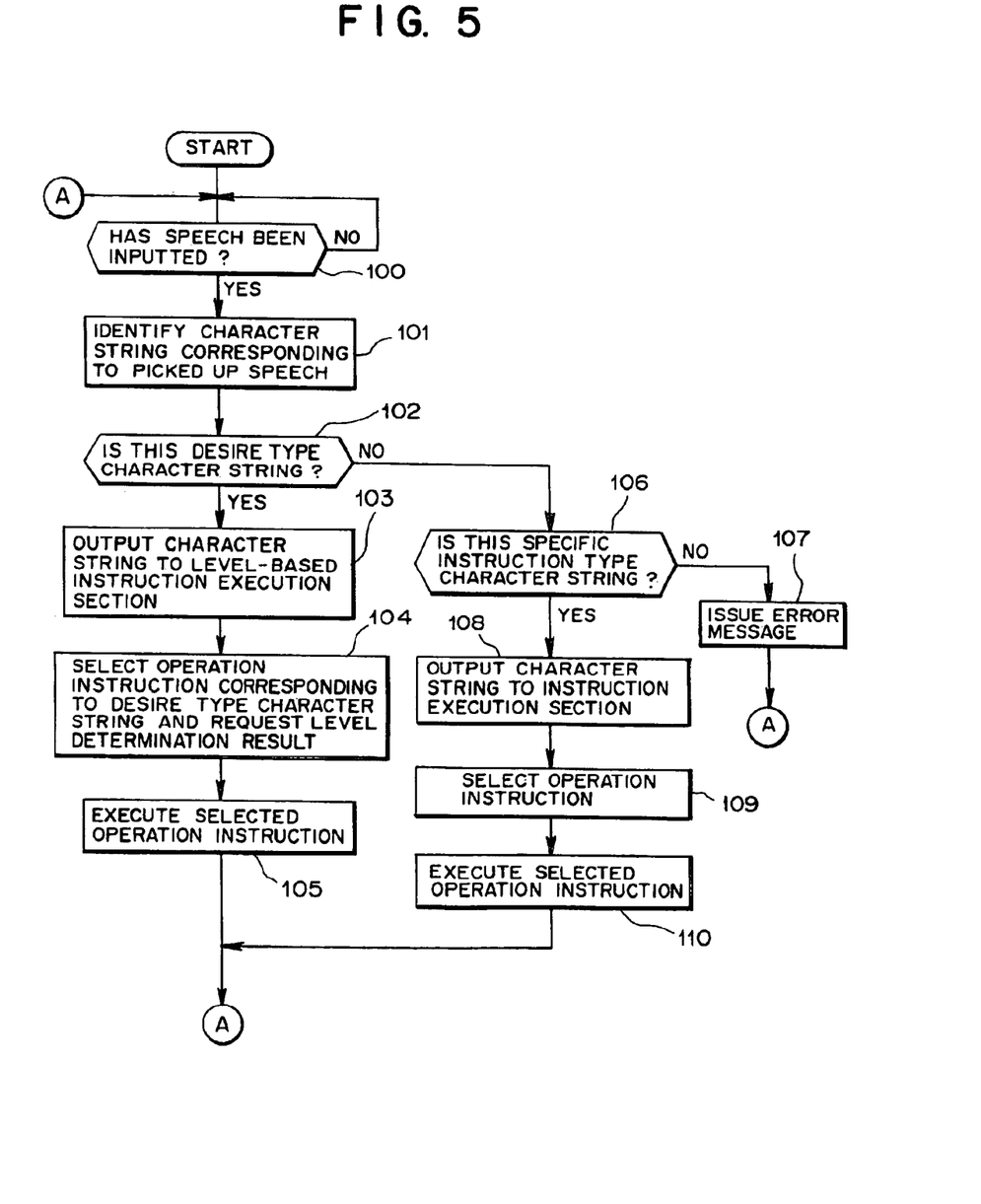
FIG. 5 is a flowchart showing an operation procedure to be followed by a speech processing system.

The vehicle system 100 and the speech processing system 1 according to this embodiment have the above-mentioned configurations. Next, an operation procedure will be described in which the speech processing system 1 subjects speech or words spoken by the user to a predetermined process to thereby output an operation instruction to the navigation unit 2 or the like. For example, an operation procedure to be followed by the speech processing system 1 when the user speaks the words "I'm tired" will be described. FIG. 5 is a flowchart showing the operation procedure to be followed by the speech processing system 1.

The speech recognition section 12 constantly determines whether or not the user has inputted his speech or words to the microphone 10 (Step 100). When the speech has been inputted, the speech recognition dictionary storage section 14 identifies a character string corresponding to the speech picked up by the microphone 10 using the speech recognition dictionary (Step 101). If the words spoken by the user are "I'm tired" as mentioned above, the speech recognition section 12 specifies the character string "TSUKARETA" corresponding to these words.

When the speech recognition section 12 specifies the character string and outputs the same, the recognition result determination section 16 determines whether or not this character string is a desire type character string (Step 102). For example, the above-mentioned character string "TSUKARETA" is determined to be a desire type character string by referring to the table shown in FIG. 2. When the inputted character string is determined to be a desire type character string, the recognition result determination section 16 outputs this character string to the level-based instruction execution section 20 (Step 103) and, at the same time, instructs the request level determination section 18 to output the determination result of a request level detected from the user's speech to the level-based instruction execution section 20.

Next, the level-based instruction execution section 20 selects an appropriate operation instruction corresponding to the character string (desire type character string) outputted from the recognition result determination section 16 and the request level determination result outputted from the request level determination section 18 (Step 104). For example, when the recognition result determination section 16 outputs the character string "TSUKARETA," and if the request level determination result is "level 1," then the level-based instruction execution section 20 selects the operation instruction: "Indication of continuous driving hours." Further, when the request level determination result is "level 2," the section 20 selects the operation instruction: "Indication of a message suggesting that the user take a rest," and when the request level determination result is "level 3," the section 20 selects the operation instruction: "Instruction to find a rest area."

The level-based instruction execution section 20 thereafter executes the selected operation instruction (Step 105). Specifically, if the above-mentioned "Indication of continuous driving hours" (corresponding to level 1) is selected, the level-based instruction execution section 20 outputs to the navigation unit 2 an instruction requiring the unit 2 to indicate to the user his continuous driving hours in the form of an image and speech. In response to this instruction, for example, a message such as "YOUR DRIVING HOURS ARE 2 HOURS AND 45 MINUTES" is displayed on the display unit 3 and also announced through the speaker 4 to the user. Similarly, when the operation instruction "Indication of a message suggesting that the user take a rest" (corresponding to level 2) is selected, a message such as "WHY DON'T YOU TAKE A REST?" is displayed on the display unit 3 and also announced through the speaker 4 to the user. Further, when "Instruction to find a rest area" (corresponding to level 3) is selected, the level-based instruction execution section 20 instructs the navigation unit 2 to send to the user a message such as "REST AREAS WILL BE FOUND" through the display unit 3 and the speaker 4 and, at the same time, also instructs the unit 2 to find rest areas near the current vehicle position (e.g., convenience stores, parking areas). Upon completion of an operation corresponding to the selected operation instruction, control returns to Step 100 to repeat the operation of determining whether or not speech has been inputted and the other operations subsequent thereto.

When the character string outputted from the speech recognition section 12 is determined as not being a desire type character string, the decision in Step 102 mentioned above is negative, and then the recognition result determination section 16 determines whether or not the character string outputted from the speech recognition section 12 is a specific instruction type character string (Step 106). If it is determined that the character string is not a specific instruction type character string, this means that the inputted speech does not fall under any of the previously stored desire type and specific instruction type character strings, and hence the recognition result determination section 16 informs the user of an error in the form of an image and speech through the instruction execution section 22, and prompts the user to input speech again (Step 107).

When the character string outputted from the speech recognition section 12 is a specific instruction type character string, the decision in Step 106 mentioned above is positive, and then the recognition result determination section 16 outputs this character string to the instruction execution section 22 (Step 108). The instruction execution section 22 selects an operation instruction corresponding to the content of the character string (specific instruction type character string) outputted from the recognition result determination section 16 (Step 109). Then, the instruction execution section 22 executes the selected operation instruction (Step 110). Specifically, for example, when a character string outputted from the recognition result determination section 16 is "EAKON WO TSUKERU," the instruction execution section 22 not only gives an operation instruction to the air conditioner 5 to operate the air conditioner 5, but also indicates a message such as "AIR CONDITIONER WILL BE TURNED ON" through the display unit 3 and the speaker 4 in order to inform the user of the content of the operation to be performed. Upon completion of the operation corresponding to the selected operation instruction, control returns to Step 100 to repeat the operation of determining whether or not speech has been inputted and the other operations subsequent thereto.

As mentioned above, the speech processing system 1 according to this embodiment determines whether or not a character string identified after a speech signal has been subjected to a speech recognition process is a desire type character string and, at the same time, determines a request level related to the desire type character string on the basis of a change in the sound pressure level extracted from the speech signal, and specifies an object to be operated and gives a predetermined operation instruction to the specified object to be operated on the basis of the content of the desire type character string and the request level determination result. Therefore, even if speech or words such as the above-mentioned example of "I'm tired" for which neither an object to be operated nor a request level are specifically indicated is inputted, the system can specify both the object to be operated and the request level so that an appropriate operation instruction can be given.

Note that the present invention is not limited to the above-described embodiment, but may be modified in various modes within the scope and spirit of the invention. For example, although the request level determination section 18 determines a user's request level on the basis of a change in the sound pressure level of speech or words spoken by the user in the above mentioned embodiment, the user's request level may be determined on the basis of a change in the pitch of a voice or in phonation interval.

Figure 6:
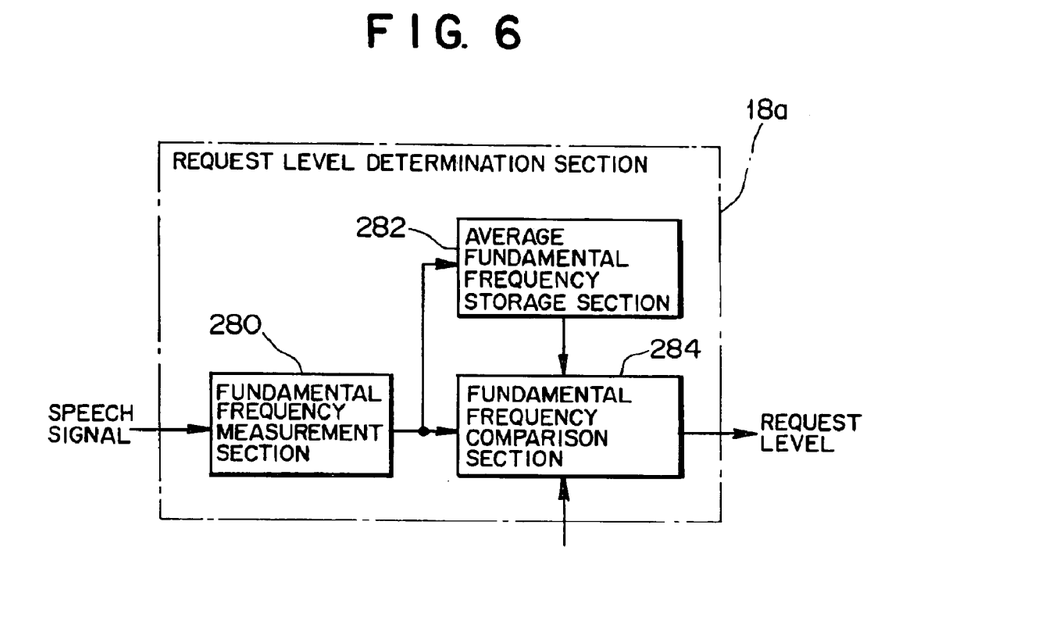
FIG. 6 is a block diagram showing a more detailed construction of a request level determination section in the case of determining a user's request level on the basis of a change in the pitch of speech.

FIG. 6 is a block diagram showing a more detailed construction of a request level determination section 18a in the case of determining a user's request level on the basis of a change in the pitch of a voice. As shown in FIG. 6, the request level determination section 18a includes a fundamental frequency measurement section 280, an average fundamental frequency storage section 282, and a fundamental frequency comparison section 284. The fundamental frequency measurement section 280 measures a fundamental frequency of speech on the basis of a speech signal outputted from the microphone 10, and converts the measured fundamental frequency into digital data. Generally, this fundamental frequency ranges from about 100 to 200 Hz for words spoken by a male and from 200 to 400 Hz for words spoken by a female. Any change in the fundamental frequency corresponds to a change in the pitch of the speech. That is, when the pitch of a voice is high, the fundamental frequency is high, while when the pitch of a voice is low, the fundamental frequency is low. The average fundamental frequency storage section 282 stores an average fundamental frequency of words spoken by the user as digital data. This average fundamental frequency is updated every time the user inputs words. The fundamental frequency comparison section 284 classifies request levels to be indicated by the user into three levels, level 1 to level 3, by comparing the fundamental frequency measured by the fundamental frequency measurement section 280 with the average fundamental frequency stored in the average fundamental frequency storage section 282.

In a specific example, the fundamental frequency comparison section 284 groups cases where a fundamental frequency outputted from the fundamental frequency measurement section 280 is lower than an average fundamental frequency into level 1, cases where the former is substantially equal to the latter into level 2, and cases where the former is higher than the latter into level 3. As mentioned above, these levels 1 to 3 correspond to the user's request levels. Level 1 indicates that the user's request level is low and level 3 indicates that the user's request level is high, while level 2 indicates that the user's request level is between levels 1 and 3. Although the request level determination section 18a shown in FIG. 6 detects the pitch of a voice by attaching importance to the fundamental frequency of speech, it may detect the pitch of the voice by considering other frequency components in the speech.

Figure 7:
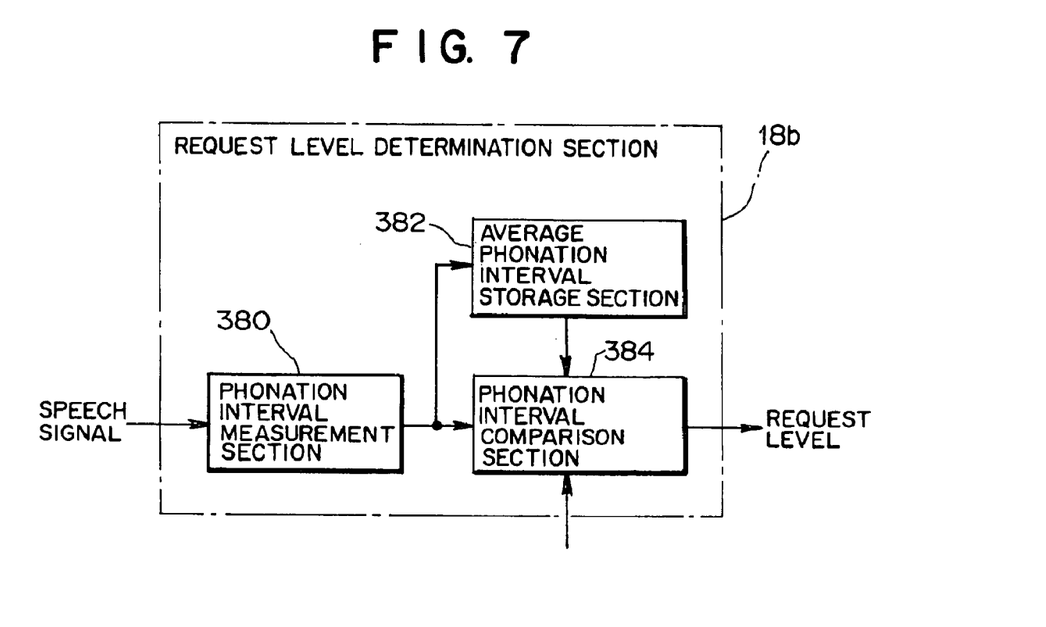
FIG. 7 is a block diagram showing a more detailed construction of a request level determination section in the case of determining a user's request level on the basis of a change in phonation interval.

FIG. 7 is a block diagram showing a more detailed construction of a request level determination section 18b in the case of determining a user's request level on the basis of a change in phonation interval. As shown in FIG. 7, the request level determination section 18b includes a phonation interval measurement section 380, an average phonation interval storage section 382, and a phonation interval comparison section 384. The phonation interval measurement section 380 measures a phonation interval of speech on the basis of a speech signal outputted from the microphone 10, and converts the measured phonation interval into digital data.

For example, when words such as "I'm tired" are inputted, a time interval corresponding to each of the syllables "TSU," "KA," "RE," and "TA" for the character string "TSUKARETA" is detected as a value of, e.g., tens of milliseconds, and the phonation interval is calculated as an average of the above time intervals corresponding to the syllables. Note that the phonation interval may be calculated by a method which is different from the above-mentioned example. The average phonation interval storage section 382 stores an average phonation interval of words spoken by the user as digital data. The average phonation interval herein means an average of phonation intervals obtained when the user speaks a number of times. The average phonation interval is updated every time the user inputs words. The phonation interval comparison section 384 classifies the user's request levels into three levels, level 1 to level 3, by comparing the phonation interval measured by the phonation interval measurement section 380 with the average phonation interval stored in the average phonation interval storage section 382.

In a specific example, the phonation interval comparison section 384 groups cases where a phonation interval outputted from the phonation interval measurement section 380 is longer than an average phonation interval into level 1, cases where the former is substantially equal to the latter into level 2, and cases where the former is shorter than the latter into level 3. As mentioned above, these levels 1 to 3 correspond to the user's request levels. Level 1 indicates that the user's request level is low and level 3 indicates that the user's request level is high, while level 2 indicates that the user's request level is between levels 1 and 3.

Figure 8:
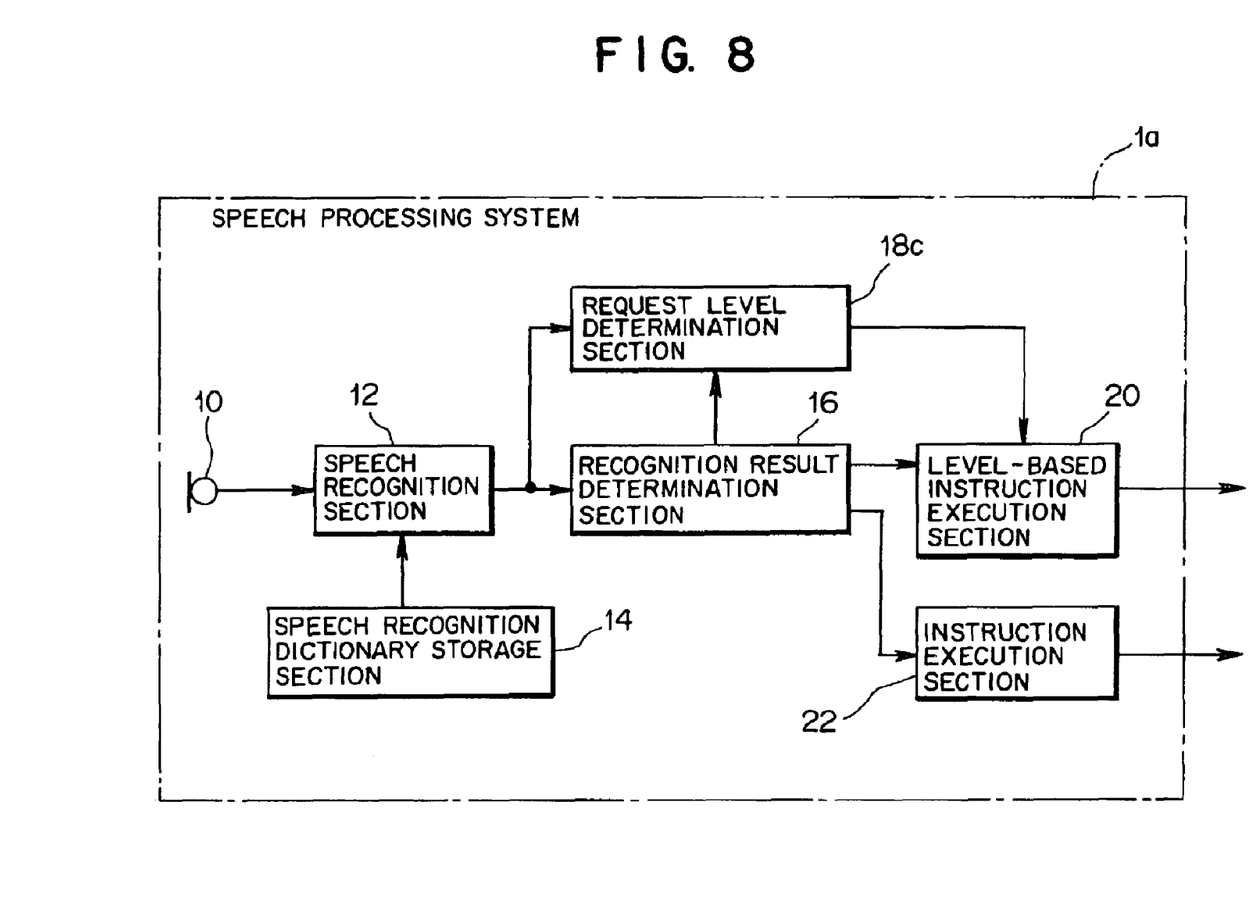
FIG. 8 is a block diagram showing the construction of a speech processing system in a modified example.
Figure 9:
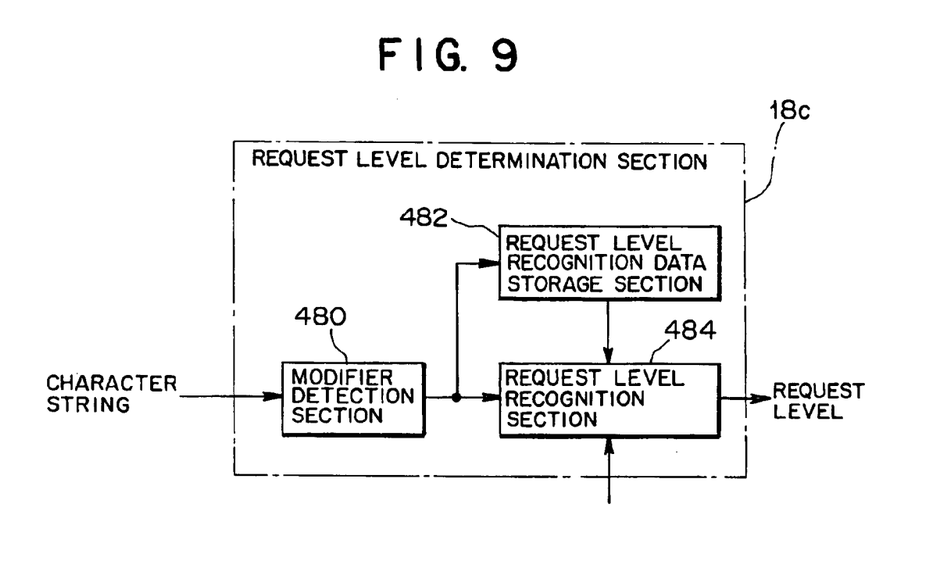
FIG. 9 is a block diagram showing a more detailed construction of a request level determination section in the case of determining a user's request level on the basis of a character string outputted from a speech recognition section.

When a predetermined modifier is included in speech or words spoken by the user, a user's request level may be determined on the basis of the content of such a modifier. FIG. 8 is a block diagram showing the construction of a speech processing system 1a in this modified example. The speech processing system 1a shown in FIG. 8 is distinguished from the speech processing system 1 shown in FIG. 1 in that a request level determination section 18c determines a user's request level on the basis of a character string outputted from the speech recognition section 12. Further, FIG. 9 is a block diagram showing a more detailed construction of the request level determination section 18c. As shown in FIG. 9, the request level determination section 18c includes a modifier detection section 480, a request level recognition data storage section 482, and a request level recognition section 484.

The modifier detection section 480 detects a predetermined modifier when such a predetermined modifier is included in a character string outputted from the speech recognition section 12. Predetermined modifiers include, for example, "SUKOSHI (a little)," "CHOTTO (a bit),"

"SHOSHO (slightly)," "SUGOKU (terribly)," "TOTEMO (very much)," and "KANARI (considerably)." For example, when the words "I'm very much tired" are inputted and the speech recognition section 12 extracts a character string "SUGOKU TSUKARETA" for such input words, the modifier detection section 480 detects a character string "SUGOKU" corresponding to the modifier "very much." Further, when a character string corresponding to a predetermined modifier is not detected, the section 480 informs the request level recognition section 484 to that effect. The request level recognition data storage section 482 stores a data table indicating a relationship between the above-mentioned predetermined modifiers and the user's request levels expressed by these modifiers.

Figure 10:
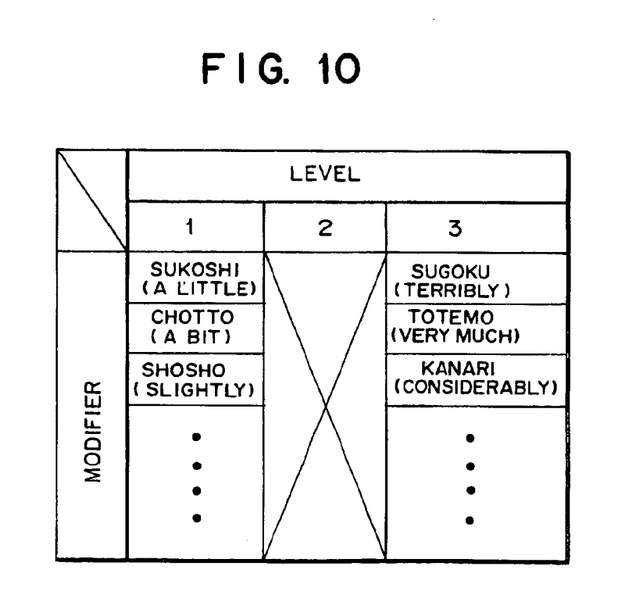
FIG. 10 is a diagram showing an exemplary data table indicating a relationship between modifiers and a user's request levels.

FIG. 10 is a diagram showing an exemplary data table that indicates a relationship between modifiers and user's request levels. As shown in FIG. 10, the above-mentioned modifiers "a little," "a bit," "slightly" and the like correspond to cases where a user's request level is low and are thus classified into level 1. Further, the above-mentioned modifiers "terribly," "very much," "considerably" and the like correspond to cases where a user's request level is high and are thus classified into level 3. Further, cases where no such modifier as mentioned above is included in words spoken by the user are classified into level 2.

The request level recognition section 484 recognizes a user's request level on the basis of both a character string (character string corresponding to a modifier) outputted from the modifier detection section 480 and the content of the data table stored in the request level recognition data storage section 482, and outputs a recognition result on the basis of an instruction given by the recognition result determination section 16. For example, when a character string outputted from the modifier detection section 480 is "SUGOKU (terribly)," the request level recognition section 484 recognizes a user's request level as being level 3 on the basis of the data table stored in the request level recognition data storage section 482. Further, when the modifier detection section 480 outputs the information that a predetermined modifier is not detected, the request level recognition section 484 recognizes the user's request level as being level 2.

While the case where any one of the loudness of a voice (sound pressure level), the pitch of a voice, the phonation interval, and the predetermined modifier is considered as a factor for determining a user's request level has been described in the above-mentioned example, a combination of two or more of these factors may be used to determine a user's request level.

Further, while the user's request levels are classified into three levels, i.e., level 1 to level 3, in the above-mentioned embodiment, the user's request levels are not limited to these three levels, but may be reduced to two levels for simple speech processing or may have an increased number of levels.

Moreover, while an exemplary case where the speech processing system in which the present invention is embodied is applied to the vehicle system has been described in the above-mentioned embodiment, the present invention is not limited thereto, but can be applied to various other systems.

As mentioned in the foregoing, according to the present invention, even if speech or words, which specifically indicates neither a unit to be operated nor a request level, are inputted, the unit to be operated can be identified and an operation instruction can be given on the basis of the content of an operation character string and a request level related to the operation character string. Therefore, various operation instructions can be interactively inputted through natural spoken language close to a conversation between humans and, at the same time, an operation instruction corresponding to a request level can be selected.

What is claimed is:

1. A speech processing system comprising:
   speech recognition means for subjecting an input speech signal to a speech recognition process to thereby specify a recognized character string corresponding to said speech signal;
   operation character string determination means for determining whether or not said recognized character string specified by said speech recognition means includes a non-specific instruction type operation character string in which an object to be operated is not specified;
   request level determination means for determining a request level related to said operation character string on the basis of at least one of a feature amount of said speech signal and said recognized character string; and
   operation instruction means for, when said operation character string determination means makes a positive determination, specifying an object to be operated on the basis of a content of said operation character string and said request level and providing a predetermined operation instruction.

2. A speech processing system according to claim 1, wherein said operation character string determination means determines whether or not said recognized character string includes a specific instruction type operation character string in which an object to be operated is specified.

3. A speech processing system according to claim 2, wherein when said operation character string determination means determines that said recognized character string includes said specific instruction type operation character string, said operation instruction means gives a predetermined operation instruction to said object to be operated which has been specified by said specific instruction type operation character string.

4. A speech processing system according to claim 1, wherein said request level determination means extracts as a feature amount at least one of a loudness of a voice, a pitch of said voice and a phonation interval on the basis of said speech signal and determines said request level on the basis of said feature amount which has been extracted.

5. A speech processing system according to claim 1, wherein said predetermined operation instruction, which is given by said operation instruction means when said recognized character string includes said non-specific instruction type operation character string, includes at least an indication of information and an instruction to execute an operation, and when said request level determined by said request level determination means is low, said operation instruction means instructs said object to be operated which has been specified to give said indication of information.

6. A speech processing system comprising:
   speech recognition means for subjecting an input speech signal to a speech recognition process to thereby specify a recognized character string corresponding to said speech signal;
   operation character string determination means for determining whether or not said recognized character string specified by said speech recognition means includes a specific instruction type operation character string in which an object to be operated is specified;
   request level determination means for extracting as a feature amount at least one of a loudness of a voice, a pitch of said voice and a phonation interval on the basis of said speech signal and determining a request level related to said operation character string on the basis of said feature amount which has been extracted; and operation instruction means for, when said operation character string determination means determines that said recognized character string includes said specific instruction type operation character string, providing a predetermined operation instruction to said object to be operated which has been specified by said specific instruction type operation character string.

7. A speech processing system according to claim 6, wherein said operation character string determination means also determines whether or not said recognized character string includes a non-specific instruction type operation character string.

8. A speech processing system according to claim 7, wherein said predetermined operation instruction, which is given by said operation instruction means when said recognized character string includes said non-specific instruction type operation character string, includes at least an indication of information and an instruction to execute an operation, and when said request level determined by said request level determination means is low, said operation instruction means instructs said object to be operated which has been specified to give said indication of information.

9. A speech processing system according to claim 6, wherein said request level determination means comprises:
- a sound pressure level measurement section for measuring a sound pressure level on the basis of said input speech signal;
- an average sound pressure level storage section for storing an average sound pressure level of speech spoken by a user; and
- a sound pressure level comparison section for comparing a sound pressure level outputted from said sound pressure level measurement section with said average sound pressure level stored in said average sound pressure level storage section and determining a level of loudness of said voice.

10. A speech processing system according to claim 6, wherein said request level determination means comprises:
- a fundamental frequency measurement section for measuring a fundamental frequency of speech on the basis of said input speech signal;
- an average fundamental frequency storage section for storing an average fundamental frequency of speech spoken by a user; and
- a fundamental frequency comparison section for comparing said fundamental frequency outputted from said fundamental frequency measurement section with said average fundamental frequency stored in said average fundamental frequency storage section and determining a level of pitch of said voice.

11. A speech processing system according to claim 6, wherein said request level determination means comprises:
- a phonation interval measurement section for measuring a phonation interval of speech on the basis of said input speech signal;
- an average phonation interval storage section for storing an average phonation interval of speech spoken by a user; and
- a phonation interval comparison section for comparing said phonation interval outputted from said phonation interval measurement section with said average phonation interval stored in said average phonation interval storage section and determining a level of phonation interval of said voice.

12. A speech processing system according to claim 6, wherein when said recognized character string includes a character string related to a predetermined modifier expressing a request level, said request level determination means also determines said request level on the basis of said character string.

13. A speech processing system according to claim 12, wherein said request level determination means comprises:
- a modifier detection section for detecting said predetermined modifier included in said recognized character string;
- a request level recognition data storage section for storing a data table indicating a relationship between said predetermined modifier detected by said modifier detection section and a request level corresponding to said modifier; and
- a request level recognition section for recognizing said request level on the basis of said predetermined modifier detected by said modifier detection section and said data table stored in said request level recognition data storage section.

14. A speech processing system comprising:
- speech recognition means for subjecting an input speech signal to a speech recognition process to thereby specify a recognized character string corresponding to said speech signal;
- operation character string determination means for determining whether or not said recognized character string specified by said speech recognition means includes a non-specific instruction type operation character string in which an object to be operated is not specified;
- request level determination means for, when said recognized character string includes a character string related to a predetermined modifier expressing a request level, determining said request level on the basis of said character string; and
- operation instruction means for, when said operation character string determination means makes a positive determination, specifying an object to be operated on the basis of said operation character string and said request level and giving a predetermined operation instruction.

15. A speech processing system according to claim 14, wherein said request level determination means comprises:
- a modifier detection section for detecting said predetermined modifier included in said recognized character string;
- a request level recognition data storage section for storing a data table indicating a relationship between said predetermined modifier detected by said modifier detection section and a request level of a user corresponding to said modifier; and
- a request level recognition section for recognizing said request level of said user on the basis of said predetermined modifier detected by said modifier detection section and said data table stored in said request level recognition data storage section.

16. A speech processing method comprising:
- subjecting an input speech signal to a speech recognition process to thereby specify a recognized character string corresponding to said speech signal;
- determining whether or not said recognized character string includes a non-specific instruction type operation character string in which an object to be operated is not specified;

identifying a request level related to said operation character string on the basis of at least one of a feature amount of said speech signal and said recognized character string; and specifying, when said operation character string is included, an object to be operated on the basis of the content of said operation character string and said request level and providing a predetermined operation instruction.

17. A speech processing method according to claim 16, wherein said act of determining said operation character string includes determining whether or not said recognized character string includes a specific instruction type character string in which an object to be operated is specified.

18. A speech processing method according to claim 16, wherein said request level is obtained by extracting as a feature amount at least one of a loudness of a voice, a pitch of said voice, and a phonation interval on the basis of said speech signal and determining said request level on the basis of said feature amount which has been extracted.

19. A speech processing method according to claim 16, wherein, when said recognized character string includes a character string related to a predetermined modifier expressing said request level, said request level is determined on the basis of said character string.

20. A speech processing method according to claim 16, wherein said operation instruction, which is given by said operation instruction means when said recognized character string includes said non-specific instruction type operation character string, includes at least an indication of information and an instruction to execute an operation, and when said request level is low, said operation instruction means instructs said object to be operated which has been specified to give said indication of information.

* * * * *